United States Patent [19]

Kapany et al.

[11] Patent Number: 4,846,543
[45] Date of Patent: Jul. 11, 1989

[54] STAR COUPLER FOR OPTICAL FIBERS

[75] Inventors: Narinder S. Kapany, Woodside; Fred C. Unterleitner, Palo Alto, both of Calif.

[73] Assignee: Kaptron, Inc., Palo Alto, Calif.

[21] Appl. No.: 134,634

[22] Filed: Dec. 18, 1987

Related U.S. Application Data

[62] Division of Ser. No. 606,119, May 2, 1984, Pat. No. 4,479,697.

[51] Int. Cl.$^4$ .......................... G02B 6/28; G02B 6/42; G02B 6/34
[52] U.S. Cl. ............................. 350/96.16; 350/96.15
[58] Field of Search ............... 350/96.15, 96.16, 96.18, 350/96.20, 96.19

[56] References Cited

U.S. PATENT DOCUMENTS

| | | | |
|---|---|---|---|
| 4,102,559 | 7/1978 | Hunzinger | 350/96.18 |
| 4,213,670 | 7/1980 | Milton et al. | 350/96.16 |
| 4,329,017 | 5/1982 | Kapany et al. | 350/96.15 |
| 4,519,673 | 5/1985 | Hamilton | 350/96.15 X |
| 4,615,582 | 10/1986 | Lefevre et al. | 350/96.15 X |
| 4,618,258 | 10/1986 | Hicks, Jr. | 350/96.15 X |
| 4,676,584 | 6/1987 | Perlin | 350/96.15 |
| 4,720,160 | 1/1988 | Hicks, Jr. | 350/96.16 X |

FOREIGN PATENT DOCUMENTS

| | | |
|---|---|---|
| 2028533 | 4/1980 | Fed. Rep. of Germany . |
| 0050555 | 4/1982 | France . |
| 2059621 | 4/1981 | United Kingdom . |

Primary Examiner—William L. Sikes
Assistant Examiner—Akm E. Ullah
Attorney, Agent, or Firm—Townsend and Townsend

[57] ABSTRACT

A star coupler/monitor comprises a beam splitter (25) and at least one imaging element (30) oriented relative to first, second, and third spatially discrete regions (35a-c) as follows. A minor portion of the light emanating from any given point in the first region (35a) is imaged at a corresponding point in the second region (35b). A major portion of the light emanating from the given point is imaged at a corresponding point in the third region (35c). The ends of N input fibers in an input bundle (12) are registered in an array in the first region (35a). The ends of N monitor fibers in a monitor bundle (15) are registered fiber-by-fiber at optically conjugate locations in the second region (35b) so that a minor portion of the light emanating from any one of the input fibers is imaged at the corresponding monitor fiber end. An integrating element (17) such as a rod is disposed in the third region (35c). The method achieves registration simply and virtually automatically by forming both bundles in the first instance from a single bundle. The method comprises the steps of providing a plurality of fibers (76), reducing the cladding thickness over corresponding intermediate portions (77) of the fibers, bonding the intermediate portions of the fibers into a tight assembly (79), severing the assembly at an intermediate point to define two bundles, and locating the two bundles so formed at optically conjugate locations.

10 Claims, 2 Drawing Sheets

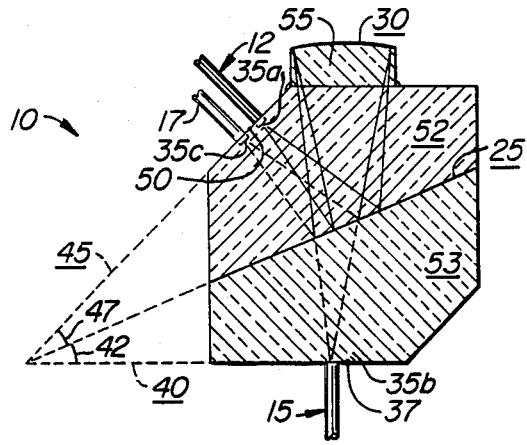
FIG._1A.
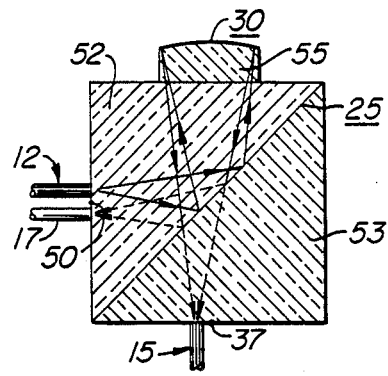
FIG._1B.
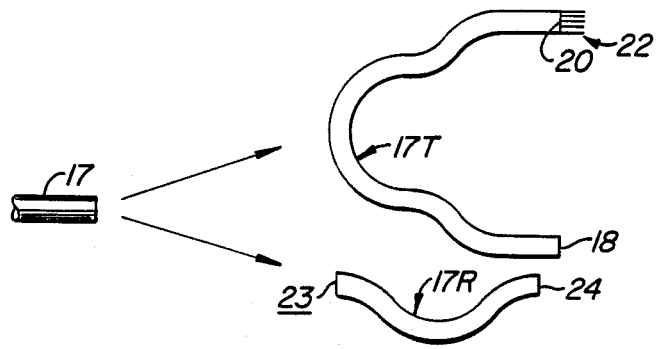
FIG._2.
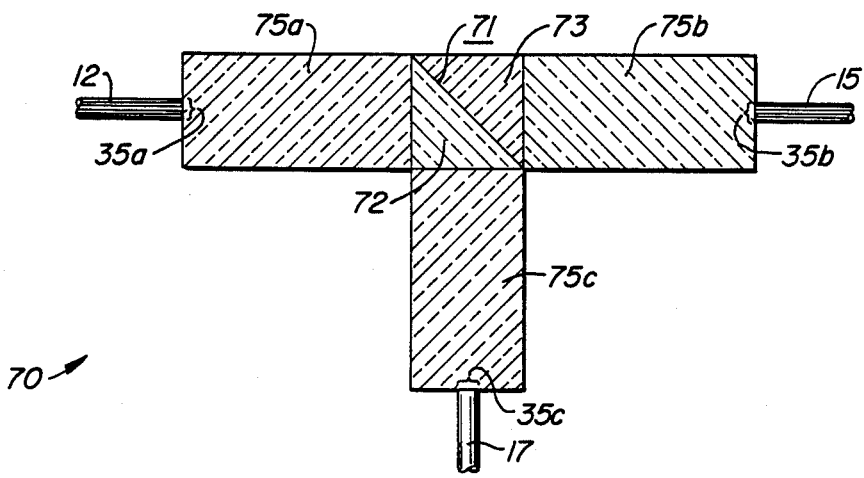
FIG._4.

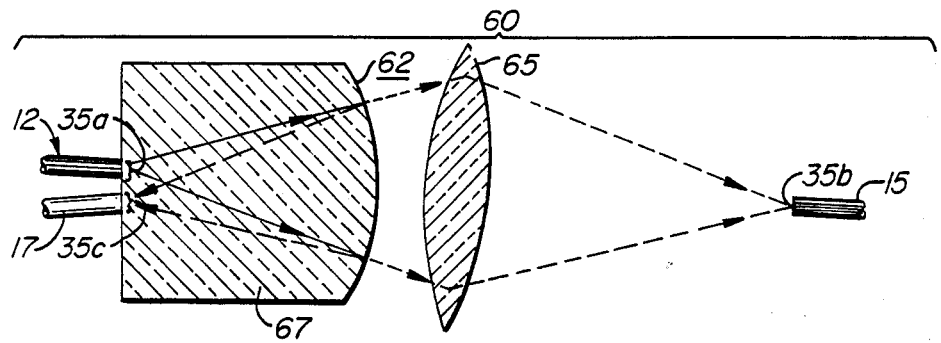
FIG._3.
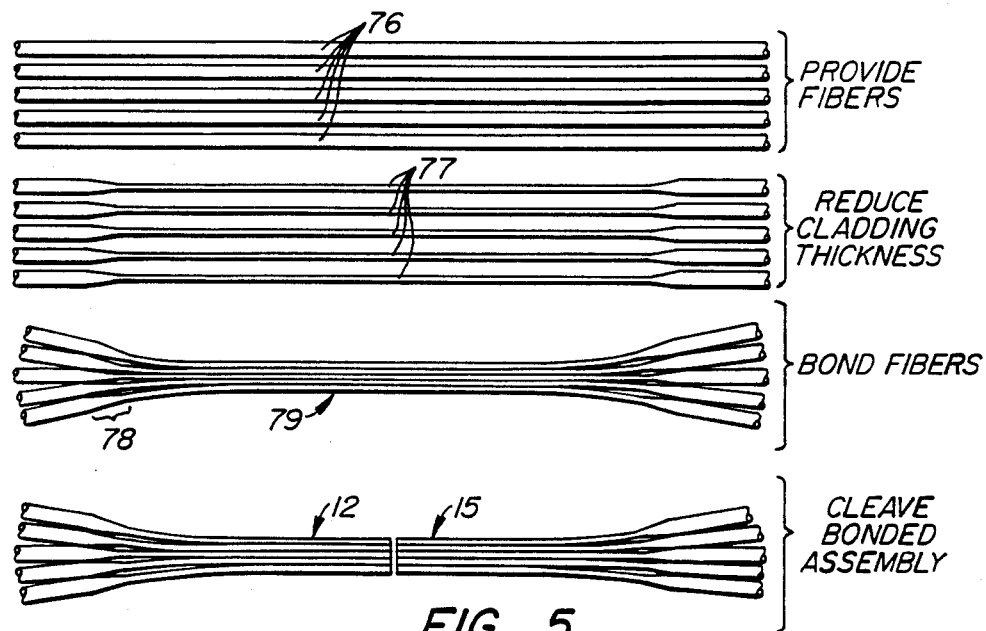
FIG._5.
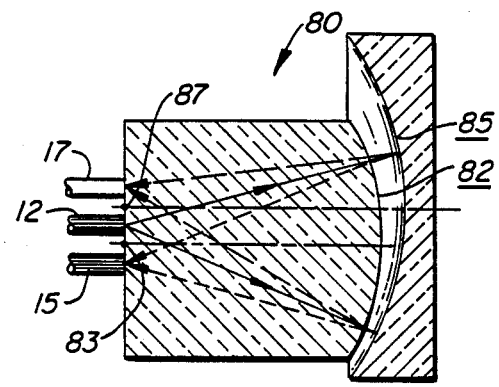
FIG._6.
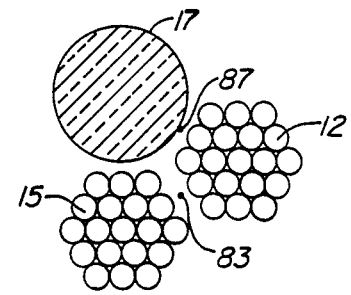
FIG._7.

4,846,543

STAR COUPLER FOR OPTICAL FIBERS

This is a division of application Ser. No. 606,119 filed May 2, 1984.

FIELD OF THE INVENTION

The present invention relates generally to fiber optics, and more specifically to interface modules for optical fibers.

BACKGROUND OF THE INVENTION

While the merit of optical fibers as a low-loss, compact communications medium is undisputed, there remains the problem of interfacing the fibers to other fibers and to detectors and sources. Any lossiness or bulkiness of the interfacing devices severely undercuts the benefits of the fiber medium. U.S. Pat. No. 4,329,017 (issued May 11, 1982) and co-pending application Ser. No. 325,256, now U.S. Pat. No. 4,479,697 (issued Oct. 30, 1984), describe a variety of loss-loss interface modules utilizing reflective imaging surfaces. The modules, through the use of partially transmissive surfaces, provide a variety of monitoring, splitting, switching, and multiplexing functions. The modules are characterized by the precise tolerances required in high-capacity optical communications systems and yet may be mass-produced at reasonable cost.

While the aforementioned modules are generally concerned with interfacing a relatively small number of fibers, there are certain applications where a large number (say 10-90) of fibers must be interconnected. For example, a star coupler is a device which allows any one of a plurality of input fibers to communicate with all of a (usually corresponding) plurality of output fibers. This is typically effected by communicating the optical signals from the input fibers into an integrating element which operates to mix such signals, and then uniformly splitting the resultant mixed signal into the output fibers. A typical star coupler construction entails removing the cladding from an intermediate region of each of a plurality of fibers to be intercoupled, and fusing the exposed cores together. The fused portion defines the integrating element, the clad portions of the fibers on one side define the input fibers, and the clad portions on the other side define the output fibers. Alternately, the end portions of the input fibers may be etched to reduce the cladding to minimal thickness, and the ends brought together and cemented to a separate integrating element. (The output fibers are handled similarly.) The fiber ends may be cemented in a linear array to the edge of a thin glass slab or in a generally circular bundle to the end of a circular rod.

A typical use for a star coupler is in a local area network where a number of terminals exchange data with one another. However, for such an application, the coupler may also be required to provide monitoring signals, each representative of the signal on a corresponding channel incoming to the coupler. The monitoring signals are communicated to a central monitoring processor which operates to prevent more than one terminal from transmitting at a given time. Provision of such monitoring signals normally requires tapping into each channel, which tends to be inconvenient and expensive in a system with a large number of channels.

SUMMARY OF THE INVENTION

The present invention provides apparatus and a manufacturing method for a star coupler/monitor characterized by low loss, ruggedness, and reasonable cost.

A star coupler/monitor according to the present invention comprises a beam splitter and at least one imaging element oriented relative to first, second, and third spatially discrete regions as follows. A minor portion (say 5%) of the light emanating from any given point in the first region is imaged at a corresponding point in the second region. A major portion (say 95%) of the light emanating from the given point is imaged at a corresponding point in the third region. The ends of N input fibers in an input bundle are registered in an array in the first region. The ends of N monitor fibers in a monitor bundle are registered fiber-by-fiber at optically conjugate locations in the second region so that a minor portion of the light emanating from any one of the input fibers is imaged at the corresponding monitor fiber end. An integrating element such as a rod is disposed in the third region.

The integrating element has an entrance portion with transverse dimensions generally commensurate with those of the bundle of input fibers. Since the entrance portion of the integrating element and the bundle of input fibers are disposed at optically conjugate locations, the major portion of the light emanating from any one of the input fibers is imaged at a corresponding point or sub-region on the entrance portion of the integrating element.

The integrating element also has an exit portion, and has the property that light propagating between the entrance and exit portions loses transverse spatial correlation with the particular sub-region over which the ligth entered the integrating element. In a transmissive embodiment of the invention, the ends of output fibers in an output bundle are abutted against the exit portion, whereupon the light entering the integrating element is equally split among the output fibers. In a reflective embodiment, the integrating element has a reflective surface, and the entrance and exit portions are coincident, whereupon the light entering the integrating element is equally split among the input fibers.

In a first embodiment, the beam splitter is a plane reflector having a high reflectivity (say 95%), and the imaging element is a single curved (preferably spherical) reflector. The first and third regions and the curved reflector are on one side of the beam splitter, while the second region is on the opposite side. Light emanating from an input fiber is reflected in major part by the beam splitter to the curved reflector. The resulting converging bundle then encounters the beam splitter once more with a major portion being reflected to be imaged on the integrating element and a minor portion passing through the beam splitter to be imaged on the corresponding monitor fiber end.

A second embodiment utilizes first and second imaging elements, the first of which is a curved reflector having a high reflectivity (say 95%), and thus incorporates the beam splitter. The first and third regions are on the same side of the first imaging element. The second imaging element is located on the opposite side, and may be a lens.

In a third embodiment, the beam splitter is a plane reflector having a high (say 95%) reflectivity, and imaging is carried out by three lenses. The first lens collimates light emanating from a point in the first region, whereupon the collimated light strikes the beam splitter. The second lens focuses the parallel light passing through the beam splitter at a corresponding point in the second region. The third lens focuses the parallel light reflected by the beam splitter at a corresponding point in the third region. The lenses are preferably graded-index (self-focusing) elements.

A preferred form of integrating element is a rod or fiber having a core diameter commensurate with the bundle diameter. The rod or fiber is bent into a serpentine configuration with a total angular deviation on the order of 270° or more. A suitable bend radius is about 25 times the fiber core diameter. To provide the required degree of angular deviation, the fiber length should be about 5 times the bend radius (assuming no straight portions).

The registration of the monitor fibers relative to the input fibers can be a daunting task, at best, when many fibers were involved. However, the present invention provides a method which achieves such registration simply and virtually automatically by forming both bundles in the first instance from a single bundle. The method comprises the steps of providing a plurality of fibers, reducing the cladding thickness over corresponding intermediate portions of the fibers, bonding (as for example by cementing or fusing) the intermediate portions of the fibers into a tight assembly, severing the assembly at an intermediate point to define two bundles, and locating two two bundles so formed at optically conjugate locations. It will be appreciated that the two resultant bundles have directly corresponding end geometries. Since the optical path between the first and second regions is characterized by an even number of reflections (two in the first case, zero in the second), the input fibers are imaged on the output fibers, fiber-by-fiber. This fiber-by-fiber imaging does not depend on there being any particular symmetry within each of the bundles. Therefore, the two bundles need only be translated and rotated relative to one other to provide substantially perfect registration of all the fibers.

In the even that the method of making the assembly (from which the bundles are obtained) provides a sufficient degree of bilateral symmetry, alignment is achieved for embodiments where the light undergoes an odd number of reflections passing in from an input fiber to the corresponding output fiber. A suitable embodiment utilizes first and second imaging elements, the first of which is a curved reflector having a low reflectivity (say 5%), and thus incorporates the beam splitter. The first and second regions are on the same side of the first imaging element. the second imaging element is located on the opposite side, and may be a curved mirror (substantially 100% reflective) or a lens.

For a further understanding of the nature and advantages of the present invention, reference should be made to the remaining portions of the specification and the attached drawings.

BRIEF DESCRIPTION OF THE DRAWINGS

FIGS. 1A–B are an optical schematics of variants of a first embodiment of a star coupler;

FIG. 2 is an optical schematic illustrating two alternate forms of integrating element;

FIG. 3 is an optical schematic of a second embodiment having the same symmetry characteristics as the first embodiment;

FIG. 4 is an optical schematic of a third embodiment having the same symmetry characteristics as the first embodiment;

FIG. 5 is a schematic of a process for manufacturing the input and monitor bundles;

FIG. 6 is an optical schematic of an alternate embodiment having different symmetry characteristics; and FIG. 7 shows a preferred packing of the fiber bundles and integrating element for the embodiment shown schematically in FIG. 6.

DESCRIPTION OF THE PREFERRED EMBODIMENT

FIGS. 1A–B are optical schematics of two variants of a first embodiment of a star coupler/monitor 10 according to the present invention. Like reference numerals are used for corresponding elements. Broadly, star coupler/monitor 10 operates to couple a bundle 12 of input fibers (designated 12(1, . . . N)) to a bundle 15 of monitor fibers (designated 15(1, . . . N)) and an integrating element 17 so that a small fraction of the light emanating from any given input fiber 12(i) is communicated to a corresponding monitor fiber 15(i) while a major portion is communicated to integrating element 17. The fibers in bundles 12 and 15 may be hexagonally closed packed, and may number 7, 19, 37, 61, 91, and so forth, although 91 is probably a practical upper limit.

Referring also to FIG. 2, integrating element 17 may assume a transmissive configuration 17T or a reflective configuration 17R. In transmissive configuration 17T, the element comprises a glass rod, one end of which defines an entrance portion 18 and the other end of which defines an exit portion 20. Element 17T is configured so that light entering entrance portion 18 at any particular point loses spatial correlation with such point in passing through the element. Thus, the light is spread out over the entire extent of exit portion 20 upon leaving.

To provide uniform integration, the rod is bent into a serpentine configuration with a total angular deviation on the order of 270° or more. It has been found, however, that deviations significantly beyond 270° lead to increases in bending loss without any further increases in integration uniformity. The total rod length (and therefore the overall integrator size) scale linearly with the bend radius. Considerations of compactness militate for a small radius, although not so small that the rod breaks. A bending radius of about 20–30 times the rod diameter is suitable. Where the rod is defined by the core of a 600-micron plastic-clad silica fiber, a bending radius of about 15 mm has been found suitable. Assuming that the bent portions are all at the constant (minimum) radius, this requires a rod length of about 5 times the bend radius for the bent portions, with additional length for any straight or transitional portions. The rod may be held in its serpentine configuration by any convenient means, such as a pair of opposed plates, at least one of which is formed with a serpentine groove. Depending on other geometric considerations, the rod can be bent so that the emerging light is travelling in the same direction as the entering light or in the opposite direction.

The serpentine configuration significantly improves uniformity of integration relative to a straight rod, particularly for light entering near the rod center (i.e., for fibers near the center of the bundle). a bundle 22 of output fibers (designated individually 22(1, . . . N) is abutted to exit portion 20 so that any light entering element 17T is split equally among the output fibers. In order to maintain maximum coupling efficiency, the fibers in bundles 12, 15, and 22 (if present) should have very thin cladding, at least in the region where the fibers come together. Additionally, the rod diameter must closely match the crosssectional diameter of bundle 22, and the numerical aperture of the rod must be at least as large as that of the fibers.

In reflective configuration 17R, the element is a rod having a reflective coating 23 on one end, with the other end, designated 24, defining coextensive entrance and exit portions. Element 17R need only be about half the length of element 17T since the light traverses element 17R twice. Accordingly, light entering element 17R at any point is reflected back to be split equally among all of input fibers 12.

In the normal course, star coupler/monitor 10 (and the other embodiments to be described below) is fabricated as a unit that can be spliced into a larger system. To this end, the fibers in bundles 12, 15, and 22 (if present) are normally provided as pigtails having a length of several inches or a few feet. The input fibers and output fibers (if any) are spliced to long fibers in the system while the monitor fibers may be coupled directly to suitable detectors.

It may sometimes be advantageous for fiber bundles 12, 15, and 22 (if present) to be other than approximately circular in cross-section. For exmaple, a ribbon-like configuration would permit greater flexibility in the number of fibers used, and could facilitate the making of mechanical connections to the fibers. For bundles having such a configuration, integrating element 17 would take the form of a slab rather than a rod.

Referring again to FIG. 1A, optically significant elements of coupler/monitor 10 include a beam splitter such as a plane reflector 25 and an imaging element such as a curved (preferably spherical) reflector 30. Beam splitter 25 is approximately 95% reflective, 5% transmissive, while imaging reflector 30 is substantially totally reflective. Input bundle 12, monitor bundle 15, and integrating element 17 are registered at first, second, and third regions 35a, 35b, and 35c.

The geometric and optical properties of spherical reflectors are described in detail in U.S. Pat. No. 4,329,017, and in co-pending patent application Ser. No. 325,256, now U.S. Pat. No. 4,479,697 (issued Oct. 30, 1984), the disclosures of which are hereby incorporated by reference. In brief, it is pointed out that the center of curvature is a self-conjugate point, and a plane passing therethrough is a self-conjugate plane. An object point in the plane and slightly displaced from the center of curvature is imaged at an optically conjugate image point in the plane, which image point is equally spaced on the other side of the center of curvature.

The center of curvature 37 of reflector 30 is located in a first self-conjugate plane 40 disposed at an angle 42 relative to reflector 25. Region 35b is located in plane 40 slightly displaced from center of curvature 37. The geometric reflection of plane 40 in the plane of reflector 25 defines a second self-conjugate plane 45 disposed at an angle 47 to reflector 25. Angles 42 and 47 are equal. The geometric reflection of center of curvature 37 is a point 50 in plane 45. Regions 35a and 35c are on opposite sides of point 50 in plane 45 with regions 35b and 35c being geometric reflections of one another. Coupler/monitor 10 is of solid construction, comprising a cemented assembly of first and second prisms 52 and 53, and a plano-convex lens 55. One of the prisms carries the beam splitter which may be a dielectric or metallic coating. The convex surface of lens 55 carries a reflective coating to define reflector 30. All the components are bonded together with an index-matching cement according to well-known methods.

In the embodiment of FIG. 1A, the geometry is based on an angle of 22.5°. In order to improve manufacturability, prisms 52 and 53 may be identical (except for the reflective coating). However, it will be appreciated that the prisms are somewhat odd shapes. A simpler configuration is based on 45° angles and is illustrated in FIG. 1B.

The consequences of the geometrical relationships as described above lead to the operation of the device as follows. Light that diverges from a fiber end in region 35a is reflected by beam splitter 25 (a small fraction is lost and plays no further part), and rendered convergent by reflector 30. The converging light encounters beam splitter 25 again. A major portion is reflected and is imaged onto a sub-region of region 35c whereupon it enters integrating element 17. A minor portion passes through beam splitter 25 and is imaged onto a fiber end in region 35b.

The operation of the embodiment of FIG. 1B may differ from that of FIG. 1A in that the larger angle of incidence on the beam splitter in the former leads to polarization sensitivity.

FIG. 3 is an optical schematic of a second embodiment of a star coupler/monitor 60. Where appropriate, like reference numerals will be used for corresponding elements. As in the embodiment of FIGS. 1A–B, a major fraction of the light emanating from any one of the fiber ends within input fiber bundle 12 is communicated to integrating element 17 while a minor fraction is communicated to a corresponding one of the fibers of monitor fiber bundle 15. However, this embodiment utilizes two imaging elements: a curved, preferably spherical reflector 62 having a high (say 95%) coefficient of reflection, and a lens 65. Input bundle 12 and integrating element 17 are located at optically conjugate regions 35a and 35c with respect to reflector 62 while monitor bundle 15 is located at region 35b which is optically conjugate to region 35a with respect to lens 65. Reflector 62 may be implemented as a coating the outer convex surface of a transparent (typically glass) body 67.

FIG. 4 is an optical schematic of a third embodiment of a star/coupler monitor 70. Where appropriate, like reference numerals are used for corresponding elements. As in the previously-described embodiments, a major fraction of the light emanating from any one of the fiber ends within input bundle 12 is communicated to integrating element 17 while a minor fraction is communicated to a corresponding one of the fibers of monitor bundle 15. However, this embodiment utilizes a plane beam splitter 17 and three imaging elements.

Coupler/monitor 70 is of solid construction, comprising a cemented assembly of first and second diagonally abutting 45° prisms 72 and 73, and first, second, and third graded index lenses 75a, 75b, and 75c. One of the prisms is suitably coated for high reflectively (say 95%) on diagonal surface to define beam splitter 71. Graded index (self-focusing) elements are well-known in the art and will not be described in detail here other than by noting that each is a onequarter-pitch element having first and second end faces such that light emanating from a point source of light in the first end face passes through the second end face as collimated light. Bundles 12 and 15 and integrating element 17 are cemented to corresponding regions on the first end faces of lenses 75a, 75b, and 75c, respectively. The second end faces of lenses 75a and 75c are cemented to prism 72 and are therefore on the same side of beam splitter 71. The second end face of lens 75b is cemented to prism 73 and is therfore on the opposite side of beam splitter 71.

The embodiments of FIGS. 1A-B, 3 and 4 are characterized by an optical path between input fibers 12 and monitor fibers 15 wherein the light is subjected to an even number of reflections (two in the case of coupler/monitor 10, none in the case of coupler/monitor 60). The significance of this will be discussed below.

It will be appreciated that in an embodiment with a large number of fibers in the input and monitor bundles, the registration on a fiber-by-fiber basis can be an excruciatingly daunting task in the fabrication of a coupler/monitor. FIG. 5 illustrates in diagrammatic form a series of steps for fabricating the input and monitor bundles so that such fiber-by-fiber registration may be accomplished easily. In short, the method contemplates the formation of the input and monitor fiber bundles in the first instance from a single bundle. To this end, a plurality of fibers 76 is first provided. As is known, fibers of one standard configuration comprise a 50-micron diameter core and a 125-micron diameter cladding surrounding the core. Fibers 76 and subjected to an etching step or the like wherein the cladding on respective intermediate portions 77 of fibers 76 is reduced to minimal thickness, say 2 microns. Intermediate portions 77 are on the order of 2-4 inches in length with transition regions 78 on the order of perhaps ¼ inch between the full diameter and the reduce diameter. The etched fibers are then bonded over at least part of portions 77 to provide a rigid assembly 79. The bonding may be accomplished by any convenient technique such as fusing or cementing. The fibers are preferably bonded into a parallel closed packed hexagonal configuration, although, as will be discussed below, for the embodiments described above, no particular symmetry requirement is imposed. Assembly 17 is then severed at an intermediate point of the bonded part to define fiber bundles 12 and 15. This may be done by cutting, for example with a diamond saw, followed by polishing the cleaved ends.

The etching step can be eliminated if fibers having a cladding of minimal thickness are provided as the starting point. This would require some special handling in the splicing of the input fibers to long fibers having normal cladding thickness.

It will be appreciated that the fiber bundles thus formed have precisely matching end geometries so that the array of fiber ends in bundle 12 corresponds precisely to the array of fiber ends in bundle 15. Thus, when the array of fiber ends in bundle 12 is imaged through a lens or through a mirror system having an even number of reflections, the imaged array corresponds to fiber bundle 15, so long as the imaging is done with unit magnification. Accordingly, alignment of bunch 15 relative to bunch 12 is easily achieved by a simple translation and rotation. Once two corresponding fibers in each bunch are optically coupled, all fibers are. The bundles need not have any particular internal symmetry.

FIG. 6 is an optical schematic of an alternate embodiment of a star coupler/monitor 80. Corresponding reference numerals are used where appropriate. The imaging and beam splitting functions are provided by a first curved reflector 82 having a center of curvature 83 and a second curved reflector having a center of curvature 87. Bundles 12 and 15 are located symmetrically with respect to center of curvature 83 of reflector 82, while bundle 12 and integrating element are located symmetrically with respect to center of curvature 87 of reflector 85. Second reflector 85 is substantially totally reflecting while first reflector 82 has a low coefficient of reflection which may be provided simply by the Fresnel reflection at a glass-air interface.

While FIG. 6 is drawn in schematic form, and shows bundles 12 and 15 on opposite sides of center of curvature 83 and bundle 12 and integrating element 17 on opposite sides of center of curvature 87, the preferred configuration is as shown in FIG. 7 with bundles 12 and 15 and integrating element 17 in a closed packed arrangement.

This embodiment is advantageous for those instances where it is desired to have the input and monitor bundles on the same side. However, it will be appreciated that this embodiment subjects light travelling between the input and monitor bundles to an odd number of reflections (one), so that the array of input fiber ends, as imaged by reflector 82, does not correspond in the same manner as in the previous two embodiments, but rather has the opposite handedness. Thus, for the method of FIG. 5 to be suitable, the resultant bundles must be possessed of bilateral symmetry. If the bundles are formed wth a close packed hexagonal configuration, and if the cladding thickness is uniformly reduced, this requirement should be met.

In summary, it may be seen that the present invention provides a simple and rugged construction and configuration for a star coupler/monitor. While the above provides a full and complete description of the preferred embodiments of the invention, various modifications, alternate constructions, and equivalents may be employed without departing from the spirit of the invention. For example, while the embodiments of FIGS. 1A-B utilize prisms 52 and 53 that are identical, there is no requirement that this be done. Indeed, a somewhat smaller configuration is possible if excess material is removed. Thus in FIGS. 1A-B, all the glass to the right of the rightmost edge of lens 55 could be removed. Additionally, while all the systems described are implemented with unit magnification, certain circumstances could tolerate or even dictate departures. Moreover, while the embodiments described above utilize solid transparent bodies to which one or more of the fiber bundles is cemented, modified versions utilizing air spaces and possibly anti-reflection coatings on the fiber ends would also be suitable.

Therefore, the above description should not be taken as limiting the scope of the invention which is defined by the appended claims.

What is claimed is:

1. An integrating element for a fiber optic star coupler comprising a transparent rod having first and second ends, said first end having a reflective coating and said second end defining an entrance portion and an exit portion, said rod being formed in a serpentine configuration defining a total amount of angular deviation of at least 270°, said angular deviation being provided on a round trip from said second end to said first end and back, whereby the integrating element is suitable for use in a reflective star coupler.

2. The integrating element of claim 1 wherein said serpentine configuration defines a minimum radius of curvature of about 20-30 times the diameter of said rod.

3. In a method of constructing an interface device for coupling the outputs from respective ones of a first bundle of N fibers to corresponding ones of a second bundle of N fibers in a device including imaging and an even number of reflections, each fiber having a cylindrical core region and a surrounding cladding having a thickness that is small compared to the core diameter over at least an intermediate portion of each of the fibers, the improvement comprising the steps of:

aligning the intermediate portions of the fibers so that they are closely packed;

bonding the intermediate regions of the fibers to provide a rigid assembly with the fiber cores rigidly aligned relative to one another;

severing the assembly at a point in the intermediate region over which the fibers are bonded, thereby defining the first and second bundles; and registering the first and second bundles in optically conjugate regions within the interface device.

4. The improvement of claim 3 wherein said bonding step comprises the step of cementing the intermediate fiber portions.

5. The improvement of claim 3 wherein said bonding step comprises the step of fusing the cladding of the intermediate fiber portions.

6. The improvement of claim 3 wherein said step of severing includes the substeps of cleaving said rigid assembly and polishing the cleaved ends resulting therefrom.

7. In a method of constructing an interface device for coupling the outputs from respective ones of a first bundle of N fibers to corresponding ones of a second bundle of N fibers in a device including imaging and an even number of reflections, each fiber having a cylindrical core region and a surrounding cladding, the improvement comprising the steps of:

removing a portion of the cladding over an intermediate portion of each of the fibers to reduce the thickness of the cladding to a thickness that is small compared to the core diameter;

aligning the intermediate portions of the fibers so that they are substantially parallel and closely packed;

bonding the intermediate regions of the fibers to provide a rigid assembly with the fiber cores rigidly aligned relative to one another;

severing the assembly at a point in the intermediate region over which the fibers are bonded, thereby defining the first and second bundles; and registering the first and second bundles in optically conjugate regions within the interface device.

8. The improvement of claim 7 wherein said bonding step comprises the step of cementing the fiber portions of reduced cladding thickness.

9. The improvement of claim 7 wherein said bonding step comprises the step of fusing the cladding of the fiber portions of reduced cladding thickness.

10. The improvement of claim 7 wherein said step of severing includes the substeps of cleaving said rigid assembly and polishing the cleaved ends resulting therefrom.

* * * * *